(12) United States Patent
Ulrich et al.

(10) Patent No.: US 7,953,291 B2
(45) Date of Patent: May 31, 2011

(54) SYSTEM AND METHODS FOR AUTOMATIC PARAMETER DETERMINATION IN MACHINE VISION

(75) Inventors: Markus Ulrich, Munich (DE); Carsten Steger, Eching (DE)

(73) Assignee: MVTEC Software GmbH, Munich (DE)

( * ) Notice: Subject to any disclaimer, the term of this patent is extended or adjusted under 35 U.S.C. 154(b) by 0 days.

(21) Appl. No.: 12/787,971

(22) Filed: May 26, 2010

(65) Prior Publication Data

US 2010/0232708 A1      Sep. 16, 2010

Related U.S. Application Data

(62) Division of application No. 11/409,531, filed on Apr. 21, 2006, now Pat. No. 7,751,625.

(30) Foreign Application Priority Data

Mar. 24, 2006   (EP) ...................................... 06006129

(51) Int. Cl.
*G06K 9/40*   (2006.01)
*G06K 9/48*   (2006.01)

(52) U.S. Cl. ........................................ 382/266; 382/199

(58) Field of Classification Search .................. 382/148, 382/144, 141, 151, 152, 161, 199, 272, 286
See application file for complete search history.

(56) References Cited

U.S. PATENT DOCUMENTS

| 6,393,159 | B1 * | 5/2002 | Prasad et al. .................. 382/259 |
| 7,401,304 | B2 * | 7/2008 | Li et al. .............................. 716/4 |
| 2002/0057838 | A1 * | 5/2002 | Steger ........................... 382/197 |
| 2004/0066964 | A1 * | 4/2004 | Neubauer et al. ............. 382/152 |

* cited by examiner

*Primary Examiner* — Yon Couso (57) ABSTRACT

The present invention provides a system and methods for automatic parameter determination in machine vision in general, and in object recognition in particular. Many machine vision systems use algorithms that demand the user to specify one or more parameters in order to adapt the behavior of the algorithm in dependence of the current application. This is not desirable because the complexity of the algorithm should be hidden from the user and a manual parameter determination is contrary to a desirable high degree of automation. The present invention provides a method to automatically determine the most frequently used parameters in machine vision solely based on the input image itself. The method is explained in detail using an object recognition system as an example. In particular, the model generation process based on a model image of the object is explained. However, also other systems that use edge extraction algorithms, for example, can benefit from the present invention.

6 Claims, 10 Drawing Sheets

SYSTEM AND METHODS FOR AUTOMATIC PARAMETER DETERMINATION IN MACHINE VISION

CROSS-REFERENCE TO RELATED APPLICATIONS

This application is a divisional of U.S. application Ser. No. 11/409,531, filed Apr. 21, 2006, which claims priority to EP Application No. 06006129.8, filed Mar. 24, 2006, both of which are incorporated herein by reference in its their entirety.

FIELD OF THE INVENTION

This invention relates generally to machine vision systems, and more particularly, to visual recognition of objects.

BACKGROUND OF THE INVENTION

Object recognition is part of many computer vision applications. It is particularly useful for industrial inspection tasks, where often an image of an object must be aligned with a model of the object. The transformation (pose) obtained by the object recognition process can be used for various tasks, e.g., robot control, pick and place operations, quality control, or inspection tasks. In most cases, the model of the object is generated from an image of the object. Additionally, often the model generation process can be influenced by a set of parameters that must be specified by the user. In order to increase the degree of automation and to improve the ease of use of the recognition system it is highly desirable to determine these parameters automatically.

The present invention provides methods for automatic parameter determination in machine vision in general, and in object recognition in particular. Many machine vision systems use algorithms that demand the user to specify one or more parameters in order to adapt the behavior of the algorithm depending on the current application (see Lisa Gottesfeld Brown. A survey of image registration techniques. *ACM Computing Surveys*, 24(4): 325-376, December 1992, William J. Rucklidge. Efficiently locating objects using the Hausdorff distance. *International Journal of Computer Vision*, 24(3): 251-270, 1997, U.S. Pat. No. 6,005,978, EP-A-1 193 642, and Markus Ulrich, Carsten Steger, and Albert Baumgartner. Real-time object recognition using a modified generalized Hough transform, *Pattern Recognition*, 36(11): 2557-2570, 2003, for example). This is not desirable because of several reasons. First, the user has to know details about the functionality of the algorithm to be able to choose reasonable parameter values. However, in many cases the complexity of the algorithm should be hidden from the user to ensure that the system can be easily operated even by non-experts. Second, if the number of input parameters increases, in many cases it is getting difficult to find the optimum values for the set of parameters even for experts. This is because some of the parameters may interact or the influence of some parameters on the result cannot be predicted well. Consequently, the user has to try different combinations to find the optimum values, which is not feasible when dealing with systems that require the user to specify more than one or two input parameters. Another reason for automatically determining the parameter values of an algorithm is to improve its flexibility. For example, in the industrial production process often the conditions change, requiring the adaptation of the parameters in accordance with the new conditions. Thus, a time-consuming manual adaptation should be avoided to prevent an interruption of the production process. The present invention provides methods to automatically determine the most frequently used parameters in machine vision solely based on the input image itself. The method is explained in detail using an object recognition system (e.g., EP-A-1 193 642, Ulrich et al. (2003)) as an example. In particular, the model generation process based on a model image of the object is explained. However, also other systems that use edge extraction algorithms, for example, can benefit from the present invention. Consequently, the following description is only illustrative and should not be construed to limit the scope of the invention.

The methods according to the various aspects of the present invention involve the determination of the following parameters:

The contrast of an object in an image. In many object recognition systems the object is described by its edges (e.g., Gunilla Borgefors. Hierarchical chamfer matching: A parametric edge matching algorithm. IEEE Transactions on Pattern Analysis and Machine Intelligence, 10(6): 849-865, November 1988, Rucklidge (1997), U.S. Pat. No. 6,005,978, EP-A-1 193 642, Ulrich et al. (2003)). The determination of the contrast parameter corresponds to finding the optimum threshold for the edge amplitude in the model image. The optimum value is found if all important characteristic details of the object exceed the threshold while noise and less important details fall below the threshold, and hence, are not included in the model. Sometimes, a more sophisticated thresholding operation is applied to the edge amplitude demanding a lower and a higher threshold parameter to be specified. This operation is called hysteresis thresholding (see J. Canny, Finding Edges and Lines in Images: *Report, AI-TR-720*, M.I.T. Artificial Intelligence Lab., Cambridge, Mass., 1983). All points having an edge amplitude that exceeds the higher threshold are immediately accepted ("secure points"). Conversely, all points with an edge amplitude less than the lower threshold are immediately rejected. "Potential" points with edge amplitudes between both thresholds are accepted if they are connected to "secure" points by a path of "potential" points. The present invention provides a method for automatically determining one threshold value if the conventional thresholding operation should be used and a method for automatically determining two threshold values if the hysteresis thresholding operation should be used.

The minimum size of object parts. In order to increase the robustness of the recognition process, it is often useful to eliminate small object parts from the model. Small object parts are more susceptible to image noise, and therefore make a stable recognition more difficult. The present invention provides a method for automatically determining the minimum size of object parts that are included in the model.

The model point reduction. In most recognition approaches, the speed of the recognition process depends on the number of points that are stored in the object model. Thus, to speed up the recognition process, the number of model points should be reduced when dealing with large objects that would lead to a high number of model points. The degree of the point reduction is automatically computed by the method according to the presented invention.

The minimum contrast of image structures. Image structures having an edge amplitude below the minimum contrast should be interpreted as image noise and should neither be included in the model nor influence the recognition process. Typically, the minimum contrast is significantly smaller than the contrast of the object. The present invention provides a method for automatically determining the noise in the model image and deriving the minimum contrast based on the estimated image noise.

The discretization step length. Object recognition approaches often discretize the pose space and transform the model in accordance with each discrete pose. A similarity measure can be used to compare the discrete poses of the model with the run-time image, in which the object should be recognized. The object is found at a given pose if the similarity for this pose exceeds a threshold. The dimensionality of the pose space depends on the transformations the object may undergo in the run-time image. In the case of 2D-translations the pose space has two dimensions, in the case of rigid transformations it has three dimensions (+1 rotation), in the case of similarity transformations it has four dimensions (+1 scaling), etc. It is obvious that the discretization step length of the translations can easily be set to 1 pixel in accordance with the pixel grid. Unfortunately, for the remaining dimensions (e.g., rotation, scaling) a comparable natural discretization step length is not available. In the present invention a method is described that can be used to automatically determine the optimum discretization step lengths for the rotation, the scaling, and further transformations of the object model.

All these parameters can be automatically determined by the methods according to the present invention solely based on a single model image of the object.

SUMMARY OF THE INVENTION

The present invention provides a system and methods for automatic parameter determination in machine vision in general, and in object recognition in particular.

The Contrast of an Object in an Image

According to a first aspect, the present invention provides a method for automatically determining the contrast of an object in an image. This is equivalent to determining the optimum threshold value for the edge amplitude. The obtained edges optimally describe the object, i.e., all important edges of the object are included in the description, while edges arising from noise or texture are excluded from the description. An optimum description is important, for example, in the field of object recognition, where the robustness and speed of the recognition process strongly depend on the object description used in the model.

In the preferred embodiment of the invention edges are extracted from a given model image using all possible thresholds for the edge amplitude. For each threshold the resulting edges are evaluated using a certain evaluation criterion yielding an edge region value. The threshold that corresponds to the extremum of the edge region value is taken to be the optimum threshold.

Several evaluation criteria are possible. However, in the preferred embodiment of the invention the curvature of the edges is used for evaluation. Because the computation of the edges' curvature is expensive a different approach is taken instead: The edges are split at points of high curvature, where the points of high curvature can be calculated very efficiently by using region morphology. Finally, the evaluation criterion, which must be maximized, is the mean length of the connected components of the split edges.

According to a preferred embodiment, the hysteresis thresholding operation is applied to the edge amplitude demanding a lower and a higher threshold parameter to be specified. In one embodiment of the invention edges are extracted and evaluated for all possible combinations of the two thresholds. Because the number of possible combinations is too high to be computed efficiently, in the preferred embodiment of the invention a different approach is chosen instead: First, one optimum threshold is determined as described above. Based on the optimum threshold the higher threshold parameter is increased until the evaluation criterion decreases too much. The same is done for the lower threshold parameter. Thus, the optimum thresholds can be determined very efficiently, because the expensive 2D problem is reduced to three 1D problems, which can be solved efficiently.

According to the first aspect, the invention provides a method for automatically determining the contrast of an object in an image comprising the steps of:
 (a) providing an electronic image of the object;
 (b) identifying an edge amplitude of the object;
 (c) identifying an edge region of the object for a range of thresholds applied to the edge amplitude;
 (d) evaluating the edge region that is obtained for the range of thresholds, wherein a higher evaluation result indicates a better evaluation;
 (e) determining an optimum threshold that corresponds to a maximum edge region value; and
 (f) providing the optimum threshold that corresponds to the maximum edge region value, representing the contrast of the object.

Step (d) preferably comprises identifying a mean negative curvature of the object edges. Furthermore, step (d) preferably comprises the steps of:
 (d1) identifying edge pixels that are 8-connected;
 (d2) determining edge pixels of strong curvature;
 (d3) deleting the edge pixels of strong curvature from the edge region to form a difference region;
 (d4) identifying connected components of the difference region; and
 (d5) providing the mean length of the connected components to identify the edge region value.

More preferably, step (d2) comprises applying four erosions to the edge pixels using filter masks.

According to a preferred embodiment, step (c) comprises identifying an edge region for combinations of lower and higher hysteresis thresholds by applying hysteresis thresholds to the edge amplitude and wherein step (f) comprises providing the hysteresis thresholds that correspond to the maximum of the edge region value to determine the contrast of the object.

In a preferred embodiment, step (f) is replaced by the following steps:
 (f1) initializing lower and higher hysteresis thresholds to the threshold that corresponds to the maximum of the edge region value obtained from step (e);
 (f2) successively incrementing the higher hysteresis threshold and identifying the edge region value by applying the lower and higher hysteresis thresholds to the edge amplitude;
 (f3) determining the edge region value that is obtained for each incremented higher threshold;
 (f4) repeating steps (f2) to (f3) until the edge region value decreases below a certain percentage of the highest obtained value;
 (f5) successively decrementing the lower hysteresis threshold and identifying the edge region by applying lower and higher hysteresis thresholds to the edge amplitude;
 (f6) determining the edge region value that is obtained for each decremented lower threshold;
 (f7) repeating steps (f5) to (f6) until the edge region value decreases below a certain percentage of the highest obtained value; and
 (f8) providing optimum lower and higher hysteresis thresholds representing the contrast of the object.

The minimum contrast (see below) is preferably determined automatically comprising the steps of:
 (g) estimating the standard deviation of image noise;

(h) determining a minimum edge amplitude by multiplying the estimated standard deviation by a predetermined factor; and
(i) using the minimum edge amplitude as the minimum contrast.

A data processing system according to the first aspect of the invention for automatically determining the contrast of an object in an image comprises means for
(g) providing an electronic image of the object;
(h) identifying an edge amplitude of the object;
(i) identifying an edge region of the object for a range of thresholds applied to the edge amplitude;
(j) evaluating the edge region that is obtained for the range of thresholds, wherein a higher evaluation result indicates a better evaluation;
(k) determining an optimum threshold that corresponds to a maximum edge region value; and
(l) providing the optimum threshold that corresponds to the maximum edge region value, representing the contrast of the object.

According to the first aspect, the invention also provides a data storage media including program instructions for determining the contrast of an object in an image, wherein the program steps comprise:
(m) providing an electronic image of the object;
(n) identifying an edge amplitude of the object;
(o) identifying an edge region of the object for a range of thresholds applied to the edge amplitude;
(p) evaluating the edge region that is obtained for the range of thresholds, wherein a higher evaluation result indicates a better evaluation;
(q) determining an optimum threshold that corresponds to a maximum edge region value; and
(r) providing the optimum threshold that corresponds to the maximum edge region value, representing the contrast of the object.

The Minimum Size of Object Parts

According to a second aspect, the invention provides a method for automatically determining the minimum size of object parts that are included in the model. The minimum size of the object parts is computed such that at most a certain percentage (e.g., 5%) of the edge pixels is eliminated. For this, the cumulative histogram of the size of the connected components is calculated. The minimum size corresponds to the first entry in the cumulative histogram that exceeds the given percentage.

According to the second aspect, the method for automatically determining the minimum size of object parts comprises the steps of
(s) providing an electronic image of the object;
(t) identifying an edge amplitude of the image;
(u) identifying an edge region of the object by applying a threshold value;
(v) identifying connected components of the edge region and determining components' length;
(w) identifying a cumulative histogram of the components' length;
(x) identifying a histogram bin that exceeds a predefined percentage; and
(y) providing a edge length that is associated with the histogram bin, representing the minimum size of object parts.

Preferably, in step (c) the threshold value is automatically obtained using the method of the first aspect of the present invention.

Furthermore, according to the second aspect, a data processing system for automatically determining the minimum size of object part comprises means for
(z) providing an electronic image of the object;
(aa) identifying a edge amplitude of the image;
(bb) identifying an edge region of the object using an automatically obtained threshold value;
(cc) identifying connected components of the edge region and determining a components' length;
(dd) identifying a cumulative histogram of the components' length;
(ee) identifying a histogram bin that exceeds a predefined percentage; and
(ff) providing an edge length that is associated with the histogram bin, representing the minimum size of object parts.

According to the second aspect, the invention also provides a data storage media including program instructions for automatically determining a minimum size of object parts, wherein the program steps comprise:
(gg) providing an electronic image of the object;
(hh) identifying a edge amplitude of the image;
(ii) identifying an edge region of the object using an automatically obtained threshold value;
(jj) identifying connected components of the edge region and determining a components' length;
(kk) identifying a cumulative histogram of the components' length;
(ll) identifying a histogram bin that exceeds a predefined percentage; and
(mm) providing an edge length that is associated with the histogram bin, representing the minimum size of object parts.

The Model Point Reduction

According to a third aspect, the degree of the point reduction is automatically computed by the method described in the presented invention. For large models, the number of model points can be reduced without a decrease of robustness or accuracy. This can be done by eliminating a sufficient number of model points, such that an optimum number of model points remains. In general, there are two possible ways to determine the optimum number of model points. The first way is to find the optimum number automatically based on several user-provided example images of the object. Thus, for each individual object a characteristic optimum number can be determined. Unfortunately, in many cases no such example images are available. Therefore, the second way is to find an optimum number automatically that is well-suited for most objects. This can be done by using several example images of many different objects. In this case, the optimum number of model points only depends on the object recognition approach and must be empirically determined once during implementation. Consequently, the user does not need to provide any example images.

According to the third aspect, the method for automatically determining a reduction factor for the number of edge points comprises the steps of:
(nn) providing an electronic image of the object;
(oo) identifying an edge amplitude of the image;
(pp) identifying an edge region of the object by applying a threshold value;
(qq) identifying an optimum number of model points that are at least necessary to achieve a predetermined robustness and accuracy; and
(rr) eliminating a respective fraction of model points such that the optimum number of model points determined in step (d) remain.

In step (c), the threshold value is preferably automatically obtained using the method of the first aspect of the present invention.

Preferably, the optimum number of edge points determined in step (d) is computed based on the current object and comprises the steps of:
- (d1) providing at least one electronic test image of the object;
- (d2) for each test image providing the number of object instances that should be recognized;
- (d3) providing a model representation of the object using the desired recognition approach;
- (d4) recognizing the object in each test image using the model representation and the desired recognition approach and determining a mean recognition time over all test images;
- (d5) reducing the number of model points by a predetermined factor;
- (d6) repeating steps (d4) to (d5) as long as the mean recognition time does not increase and as long as the number of object instances provided in step (d2) is found in each test image; and
- (d7) using an optimum number of model points for which the number of object instances provided in step (d2) is found and the mean recognition time is minimal.

More preferably, the optimum number of edge points determined in steps (d1)-(d7) is independent of the current object by repeating the steps (d1)-(d7) for a large number of objects and providing the mean value of an optimum number of model points.

A data processing system for automatically determining a reduction factor for the number of model points according to the third aspect of the invention comprises means for
- (ss) providing an electronic image of the object;
- (tt) identifying an edge amplitude of the image;
- (uu) identifying an edge region of the object by applying an automatically obtained threshold value;
- (vv) identifying an optimum number of model points that are at least necessary to achieve a predetermined robustness and accuracy; and
- (ww) eliminating a respective fraction of model points such that the optimum number of model points determined in step (d) remain.

According to the third aspect, the invention also provides a data storage media including program instructions for automatically determining a reduction factor for the number of model points, wherein the program steps comprise:
- (xx) providing an electronic image of the object;
- (yy) identifying an edge amplitude of the image;
- (zz) identifying an edge region of the object by applying an automatically obtained threshold value;
- (aaa) identifying an optimum number of model points that are at least necessary to achieve a predetermined robustness and accuracy; and
- (bbb) eliminating a respective fraction of model points such that the optimum number of model points determined in step (d) remain.

The Minimum Contrast of Image Structures

According to a fourth aspect, the invention provides a method for automatically determining the noise in the model image and deriving the minimum contrast based on the estimated image noise. Because the minimum contrast separates the model from the noise in the image, a good choice is the range of gray value changes caused by the noise in the image. Therefore, in a preferred embodiment of the invention one of several existing methods is used to estimate the standard deviation of the noise in the model image. Then, all edge pixels that have an edge amplitude below the estimated standard deviation multiplied by a certain factor are eliminated from further processing. The higher the factor is the lower is the possibility that edges that are caused by noise are falsely accepted.

The Discretization Step Length

According to a fifth aspect of the present invention, a method is described to automatically determine the optimum discretization step lengths for the rotation, the scaling, and further transformations of the object model. The angle step length determines the step length within the user-specified range of angles, in which the object may appear in a run-time image. If the angle step length is set too small the recognition time as well as the memory needed to store the model increases. On the other hand, if the angle step length is chosen too high, the robustness of the recognition decreases because certain orientations of the object in the run-time image cannot be found. In one embodiment of the invention, first, an initial guess of the angle step length is computed based on the size of the object as proposed in EP-A-1 193 642. In the second step, the initial guess is evaluated by rotating the model image by half the initial guess and calculating the similarity between the object and the rotated model image. If the similarity measure is below a certain threshold, the angle step length is halved. This process is repeated until the similarity measure exceeds the threshold, resulting in the optimum angle step length.

According to the fifth aspect, a method for automatically determining the discretization step length of an object model according to a first embodiment comprises the steps of:
- (ccc) providing an electronic image of the object;
- (ddd) providing an initial value for the discretization step length based on the size of the object;
- (eee) identifying a minimum similarity measure that is associated with the current discretization step;
- (fff) halving the discretization step length until the associated minimum similarity measure exceeds a certain threshold to determine a resultant discretization step; and
- (ggg) using the resultant discretization step length to determine model transformations for object recognition.

Preferably, step (b) comprises the steps of
- (b1) computing the maximum distance of the model points from the fixed point of the transformation;
- (b2) assuming a maximum allowed pixel displacement; and
- (b3) computing the initial value for the discretization step length based on the maximum distance and the allowed pixel displacement.

Preferably, the minimum similarity measure in step (c) corresponds to the similarity measure between a non-transformed object model and the model image that has been transformed by half the discretization step length.

A data processing system for automatically determining a discretization step length of an object model according to this embodiment of the fourth aspect of the invention comprises means for
- (hhh) providing an electronic image of the object;
- (iii) providing an initial value for the discretization step length based on the size of the object;
- (jjj) identifying a minimum similarity measure that is associated with the current discretization step;
- (kkk) halving the discretization step length until the associated minimum similarity measure exceeds a certain threshold to determine a resultant discretization step; and (lll) using the resultant discretization step length to determine model transformations for object recognition.

Furthermore, the invention provides a data storage media including program instructions for automatically determining a discretization step length of an object model, wherein the program steps comprise:
(mmm) providing an electronic image of the object;
(nnn) providing an initial value for the discretization step length based on the size of the object;
(ooo) identifying a minimum similarity measure that is associated with the current discretization step;
(ppp) halving the discretization step length until the associated minimum similarity measure exceeds a certain threshold to determine a resultant discretization step; and
(qqq) using the resultant discretization step length to determine model transformations for object recognition.

According to an alternative embodiment, a method for automatically determining the discretization step length of an object model comprises the steps of:
(rrr) providing an electronic image of the object;
(sss) initializing a current step length with 0;
(ttt) incrementing the current step length by a sufficiently small value;
(uuu) identifying a similarity measure between a non-transformed model and a model image transformed in accordance with the current step length;
(vvv) repeating the steps (c) and (d) until the similarity measure is below a certain threshold; and
(www) providing an optimum step length as twice the last step length for which the similarity measure is above the threshold.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENTS OF THE INVENTION

The Contrast of an Object in an Image

The contrast of an object in an image depends on various influences, e.g., the real contrast of the object in the world, the illumination (intensity, position, orientation), the camera settings (shutter, aperture, gamma correction, etc.), the viewing angle of the camera with respect to the object, the reflectance properties of the object, etc. In order to compute the contrast of the object in an image it is apparently not feasible to model the imaging process including all these parameters. Instead, the contrast should be automatically derived based on a single image of the object. Based on this contrast value, edges can be extracted that optimally describe the object. An optimum description, on the one hand, comprises only those edges in the image that belong to the object. Edges that arise from other image structure, e.g. noise, a textured background or other image disturbances should be excluded from this description. On the other hand, an optimum description also ensures that all relevant object parts are included, i.e., the object should be described completely.

Figure 1A:
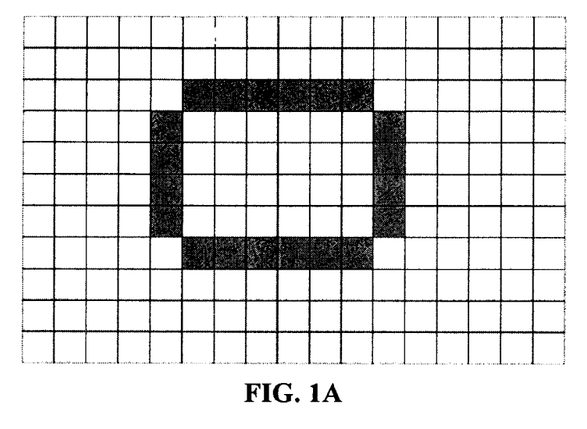
FIG. 1 illustrates edges of a rectangular example object using different thresholds for the edge amplitude.
Figure 1B:
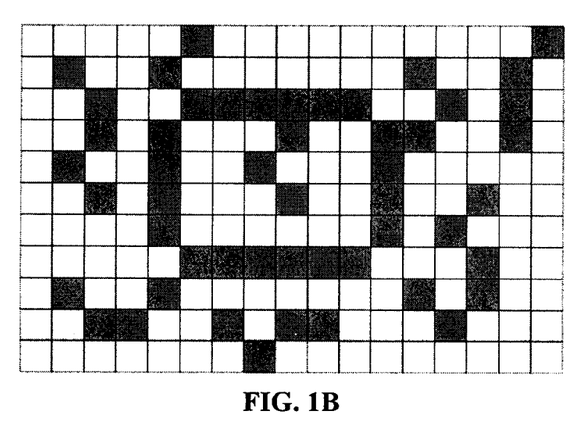
Figure 1C:
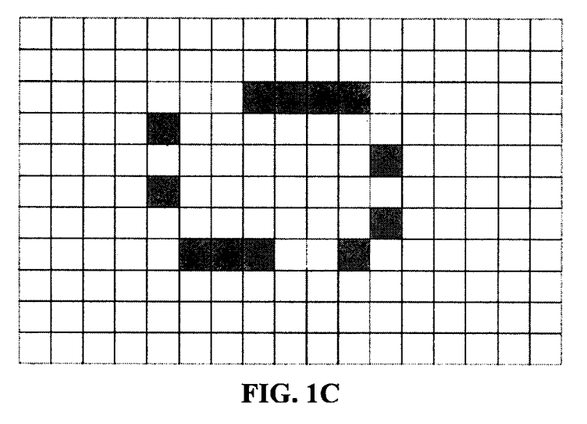

For example, if the edges of an object should be determined in a model image in order to create a model for object recognition, one usually computes the edge amplitude and applies a threshold to the amplitude. The resulting edge region of a rectangular object is shown in FIG. 1A after the optimum threshold has been applied. Here, the pixels of the image are represented by squares, where the dark pixels indicate the extracted edge region. If the threshold value is chosen too small, edges that are due to noise or background texture are extracted (FIG. 1B), which in most cases do not contain any useful information. Most object recognition approaches try to find an object by comparing the model with a run-time image using some similarity measure. Consequently, the robustness of the search would decrease because the noise and the background texture are different in the run-time image in comparison to the model image. On the other hand, if the threshold value is chosen too large, some of the object edges are missing in the model description resulting in a loss of information (FIG. 1C). Therefore, the distinctive power of the model description would decrease leading to more false positive matches. Consequently, the determination of the contrast of an object in an image is equivalent to finding the optimum threshold for the edge amplitude.

An additional problem arises when using image pyramids. Many algorithms in machine vision are embedded in a coarse-to-fine framework using image pyramids to speed up the computation (see Steven L. Tanimoto. Template matching in pyramids. Computer Graphics and Image Processing, 16:356-369, 1981, Borgefors (1988), Brown (1992), EP-A-1 193 642 or Ulrich et. al (2003), for example). An image pyramid is computed by successively applying a smoothing and a sub-sampling operation to the original image leading to progressively smaller images. In object recognition systems that make use of image pyramids the search is typically started in a coarse (high) pyramid level, and continued in a local area at the next finer (lower) level where the similarity measure in the coarse level is promising. Therefore, it is often desirable to maximize the number of pyramid levels in order to reduce the computation time as much as possible. Because of the successive smoothing that is applied when creating the image pyramid, the edge amplitude decreases on higher pyramid levels. Thus, on a certain level, the edge amplitude falls below the threshold. This naturally defines the upper limit for the number of pyramid levels that can be used. If the contrast is chosen too high, this already happens on a lower pyramid levels, and hence, the number of useable pyramid levels is reduced, which is not desirable.

Figure 2:
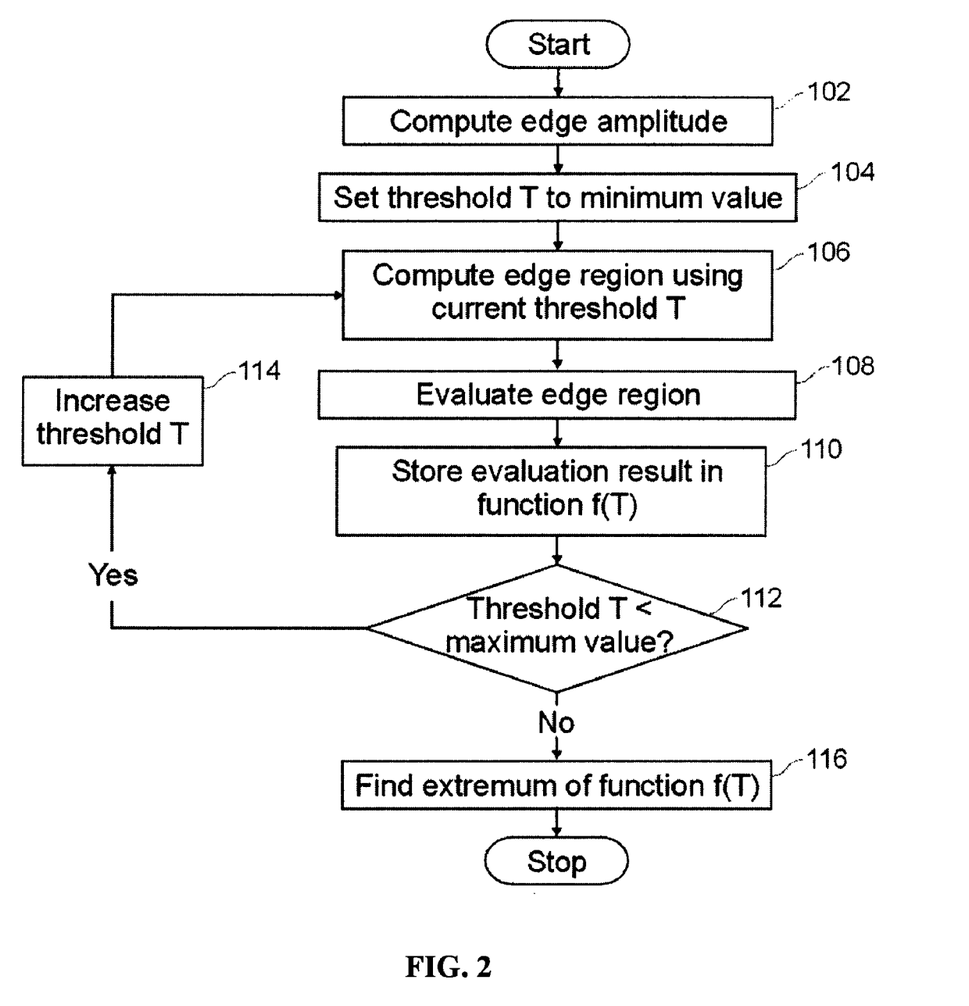
FIG. 2 is a flow chart illustrating principal steps in the computation of the optimum threshold for the edge amplitude, i.e., the contrast of an object.
Figure 8:
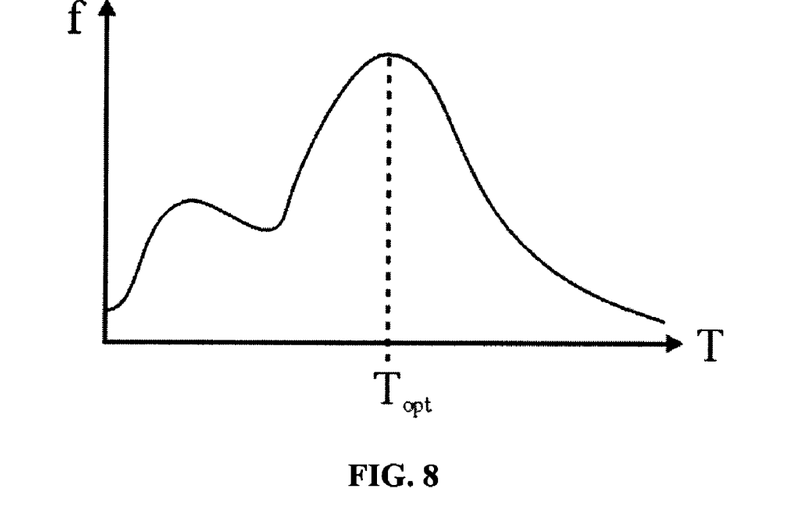
FIG. 8 shows the edge region values, i.e., the result of the evaluation of the object edges, with respect to the threshold for the edge amplitude which is needed to determine the optimum threshold.

In the following, a method is described, which facilitates an automatic computation of the optimum threshold value. Referring to FIG. 2, the method of the invention computes the edge amplitude of the input image (step 102). This can be done by applying a standard edge filter. In the preferred embodiment of the invention, the Sobel filter is used to compute the first derivatives dr and dc in row and column direction, respectively (Rafael C. Gonzales, Richard E. Woods, Digital Image Processing, Addison-Wesley Publishing Company, 1992). The edge amplitude is finally obtained from dr and dc, e.g., by calculating $\sqrt{dr^2+dc^2}$. In the second step (step 104) the threshold value T is initially set to the minimum value. In one embodiment of the invention the minimum value can be specified by the user and determines the lower bound of the automatically computed contrast value. The minimum value might be 1, if no further information is available. Alternatively, in a preferred embodiment it might be set to the noise level of the image, which can also be determined automatically, as will be shown later. Finally, the threshold is applied to the edge amplitude and the image region in which the edge amplitude exceeds the threshold is obtained (step 106). This edge region (see FIG. 1, for example), which typically consists of one pixel-wide structures, is evaluated based on a certain criterion (step 108). Different kinds of criteria are possible for evaluating the edge region, however, the criterion should be chosen such that the resulting edge region value shows an extremal value at the position of the optimum threshold $T_{opt}$ (see FIG. 8, for example). The result of the evaluation, which typically is represented by a scalar edge region value, is stored in a function array $f(T)$ at the position of the current threshold value (step 110). For example, if the current threshold is 20 and the edge region value is 0.3 then $f(20)$ is set to 0.3. After this step, the current threshold value T is increased (step 114) and the steps 106-114 are repeated as long as the threshold does not exceed a certain maximum value (step 112). The maximum value can be specified by the user and determines the upper bound of the automatically computed contrast value. In a preferred embodiment, the maximum value is set to the largest possible edge amplitude that can occur in the image. In a preferred embodiment, the step size with which the threshold is incremented in step 114 is set to 1. In other embodiments, the step size is set to a larger value (e.g., 2, 3, or 4) in order to speed up the automatic computation of the optimum contrast. After the maximum threshold has been reached, the function $f(T)$ contains for each evaluated threshold the corresponding edge region value as shown in FIG. 1. In the last step, the global extremum of the function $f(T)$ is robustly extracted (step 116). This can be done by applying one of various standard methods. In a preferred embodiment of the invention the function is smoothed several times using smoothing filters of different size, starting with a sufficiently large filter size. The smoothing is successively reduced until only a single extremum that fulfills some consistency checks remains. One possible consistency check is that the extremum must not lie at the boundaries of the domain, i.e., it must differ from the minimum or maximum tested threshold value. Another possible consistency check is that the number of resulting edge pixels must lie within some reasonable limits. Finally, the position of the extremum corresponds to the optimum threshold $T_{opt}$ value, which represents the contrast of the object.

Figure 3:
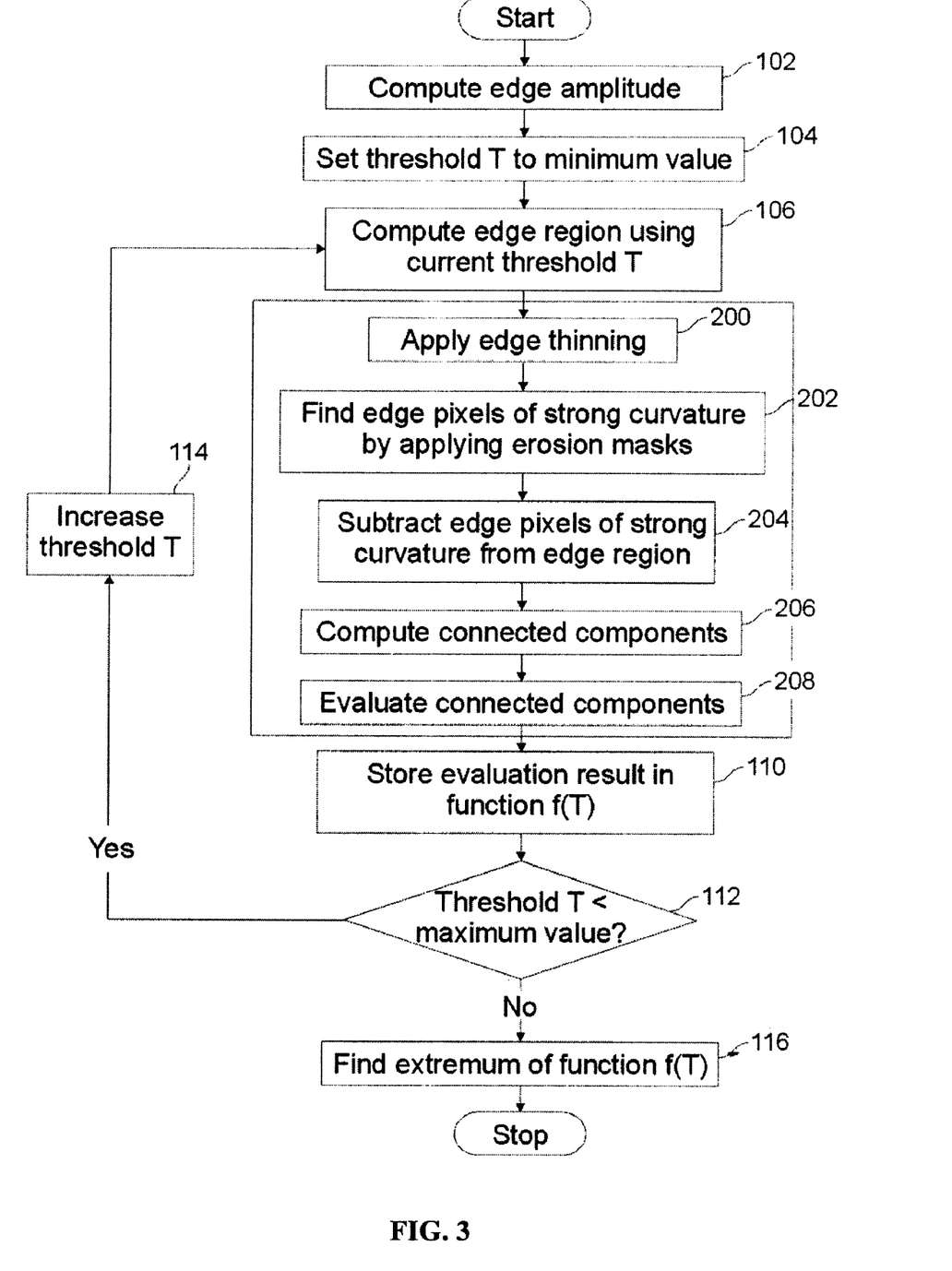
FIG. 3 is a flow chart illustrating principal steps in the computation of the optimum threshold for the edge amplitude where the single steps of evaluating the extracted edges are shown.

In the following, one of different possible evaluation criteria is described in detail, which is used in a preferred embodiment of the invention. Edges that belong to the object can be distinguished from edges that are caused by noise or texture by considering the curvature of the edges. Typically, edges that describe the object show a lower curvature than edges that are caused by noise or texture. Thus, in one embodiment of the invention the mean edge curvature is used as the evaluation criterion. The curvature can be computed, for example, by applying an edge linking algorithm to the extracted edge region and deriving the curvature based on consecutive edge points. Unfortunately, the computation of the edge linking process and the curvature computation is expensive. Therefore, in the preferred embodiment of the invention a different approach is applied. The flowchart of this approach is shown in FIG. 3. The flowchart only differs from that shown in FIG. 2 by the steps 200-208, which represent one particular embodiment of step 108 of FIG. 2.

The basic idea is to split the edge region at points of high curvature. Typically, the length of the split edge segments that belong to the object is high while the length of the split edge segments that belong to image noise or texture is small. Consequently, a good evaluation criterion would be the mean length of the edge segments after splitting them at points of high curvature. This criterion returns a low edge region value if the threshold is chosen too low because a lot of noisy edges are present leading to many short edge segments. If the threshold increases the criterion returns a higher edge region value and reaches a maximum at the optimum threshold. If the threshold further increases, the object edges break apart leading again to shorter edge segments, and hence, to a decrease of the evaluation result.

Figure 4A:
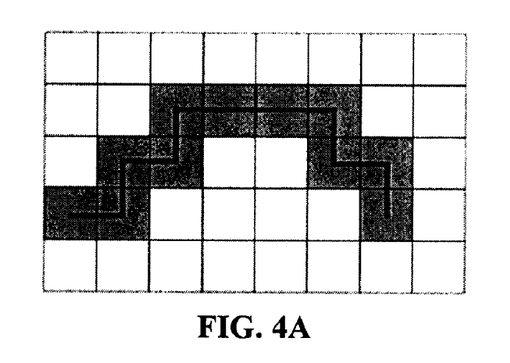
FIG. 4 illustrates the difference between 4-connected edges and 8-connected edges.
Figure 4B:
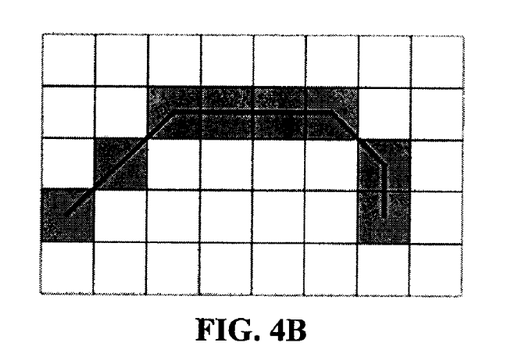
Figure 5:
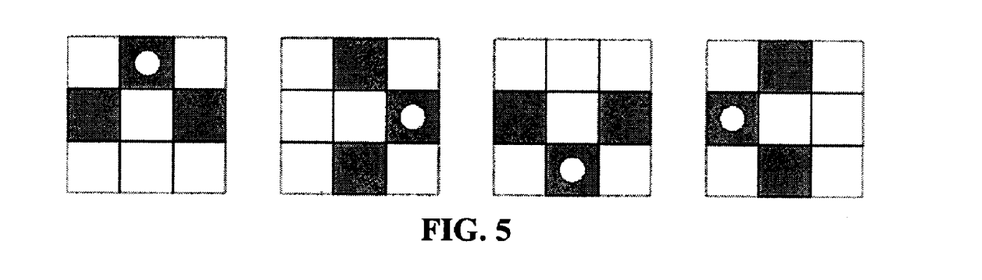
FIG. 5 shows the morphological filter masks that are used as structuring elements in an erosion operation to determine edge pixels of high curvature.
Figure 6A:
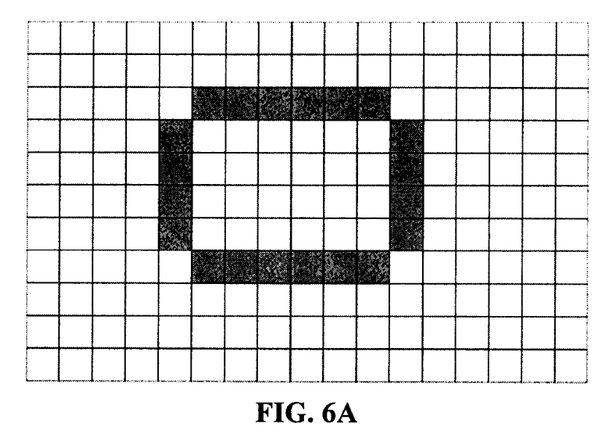
FIG. 6 shows the result of the erosion operation in terms of white circles for the edges of FIG. 1.
Figure 6B:
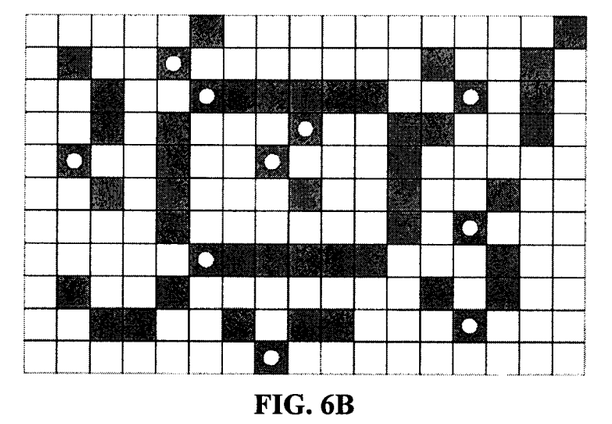
Figure 6C:
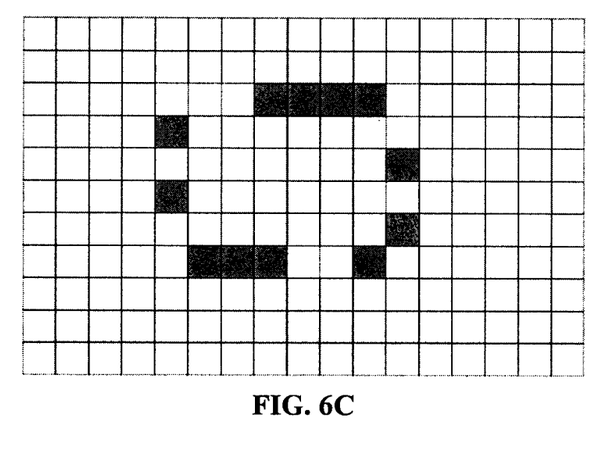
Figure 7A:
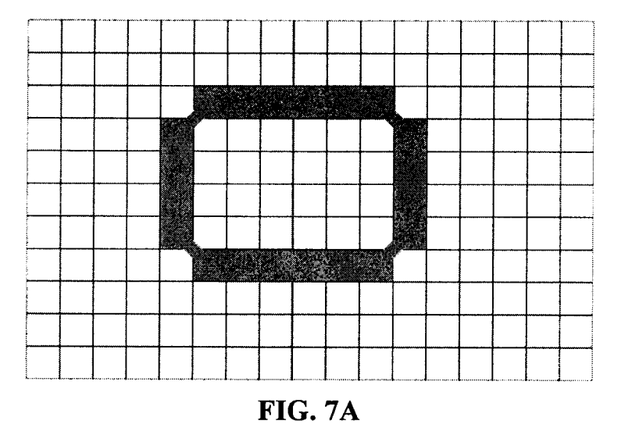
FIG. 7 shows the connected components of the edges of FIG. 1 after splitting the edges at points of high curvature shown in FIG. 6.
Figure 7B:
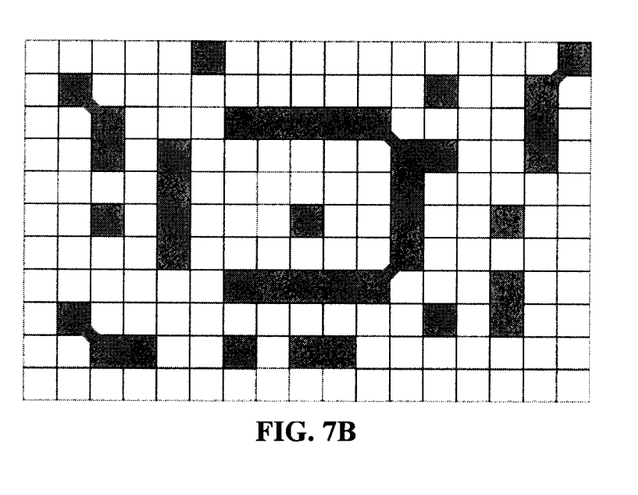
Figure 7C:
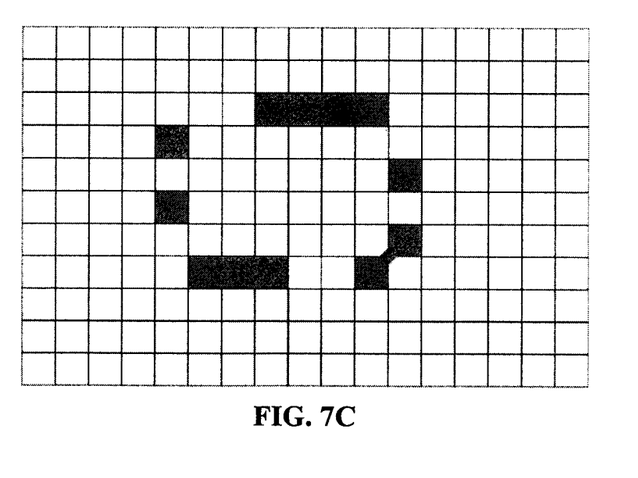

In order to split the edge region at points of high curvature, it is necessary to thin the edge region to a one pixel-wide structure (step 200). This step can be omitted if the computation of the edge region already returns one-pixel-wide structures. Otherwise one of several available edge thinning algorithms can be applied (see Canny (1983), U. Eckardt, Verdünnung mit Perfekten Punkten, *Proceedings* 10. *DAGM-Symposium*, IFB 180, Zurich, 1988, or Conzales and Woods (1992), for example). An example is shown in FIG. 4. The edge region that is obtained after applying the threshold to the edge amplitude is shown in FIG. 4A. Adjacent edge pixels are 4-connected leading to two-pixel-wide diagonal edges. After the thinning step, edges are 8-connected resulting in the desired one-pixel-wide diagonal edges (see FIG. 4B). The next step comprises the detection of edge pixels of high curvature (step 202). For this, four morphological filter masks are applied to the thinned edge pixels. The filter masks are displayed in FIG. 5. Each filter mask represents one of four possible orientations of an edge segment consisting of three adjacent edge pixels with a high or strong curvature. For each filter mask an erosion (see, e.g., Gonzales and Woods, 1992) of the thinned edge region is applied, where the filter mask is used as the structuring element of the erosion. The reference point of the four structuring elements is visualized by white circles in FIG. 5. The result of the erosion is the set of edge pixels such that the structuring element with the reference point translated to that edge pixel is completely contained in the original edge region. When applying the erosion to the three examples shown in FIG. 1 one obtains the edge pixels that are indicated by white circles in FIG. 6. In FIG. 6A and FIG. 6C no edge pixels of high curvature are returned, while in FIG. 6B a total of 10 edge pixels of high curvature have been found. In order to split the edge region at the points of high curvature, the extracted pixels of high curvature are subtracted or deleted, respectively, from the edge region (step 204). The final result is shown in FIG. 7. For the resulting split edge regions the connected components are computed (step 206). Two edge pixels p and q are to be said connected if q is included in the 8-neighborhood of p (see Conzales and Woods, 1992 for details). To visualize the connected components obtained for the example, for illustration purposes small diagonal gray strips indicate the connections in FIG. 7. Thus, in FIG. 7A only one connected component is obtained, in FIG. 7B a total of 14 connected components are returned, and in FIG. 7C a total of 6 connected components are found. The final step comprises the evaluation of the connected components (step 208). For this, the mean length of the connected components is computed. The length of a component is approximated by its number of pixels. Consequently, the resulting mean length of the components is 20.0 in FIG. 7A, 2.9 in FIG. 7B, and 2.0 in FIG. 7C. In the example, the maximum of the evaluation function is 20.0, and hence, the corresponding threshold is selected to be the optimum. In turn, the optimum threshold finally represents the contrast of the object in the image.

Figure 9:
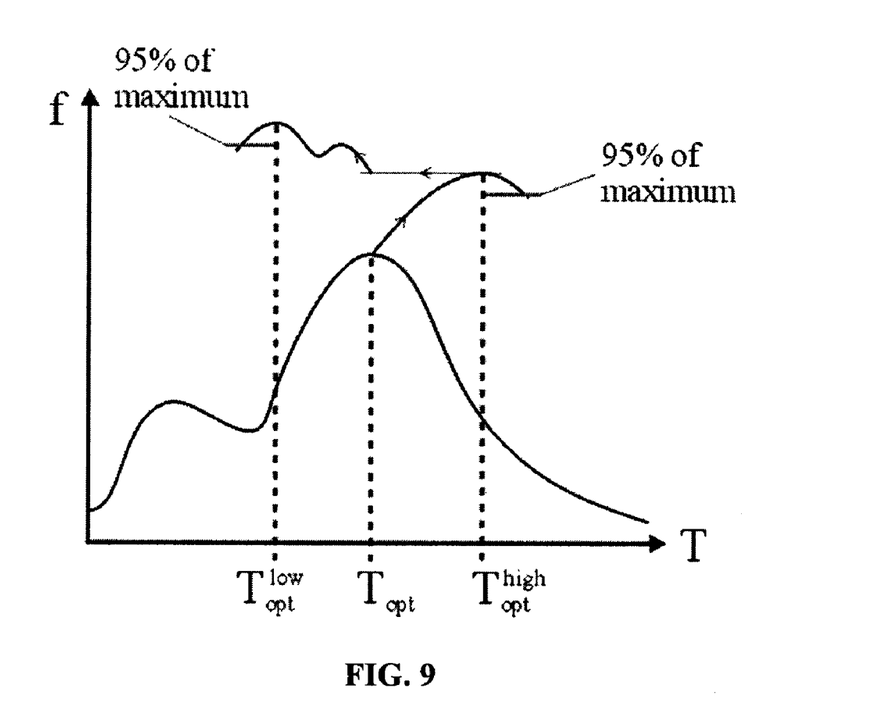
FIG. 9 shows the edge region values, i.e., the result of the evaluation of the object edges, with respect to the threshold for the edge amplitude which is needed to determine the optimum thresholds of the hysteresis thresholding operation.

Sometimes, the hysteresis thresholding operation may be applied to the edge amplitude demanding a lower and a higher threshold parameter to be specified. Thus, the contrast of an object is represented by the two parameters $T^{low}$ and $T^{high}$. In one embodiment of the invention, for all possible combinations of the two thresholds, where $T^{low} \leq T^{high}$, the edge region is computed and evaluated as described above. Therefore, the obtained function $f(T^{low}, T^{high})$ is a function of two variables. Analogously to the 1D case the extremum of this function is extracted in order to find the optimum values for $T^{low}$ and $T^{high}$. Unfortunately, when following this approach, the computation of the optimum thresholds is very time consuming, because, in general, the number of possible combinations of $T^{low}$ and $T^{high}$ is very high. For example, in the case of 200 threshold values to be tested, there are 20100 possible combinations for which edges must be extracted and evaluated. Therefore, in a preferred embodiment of the invention the 2D problem is reduced to three 1D problems as illustrated in FIG. 9. First, one optimum threshold $T_{opt}$ is determined in the same way as described for the 1D case according to the flow chart of FIG. 2 or FIG. 3. Both thresholds $T^{low}$ and $T^{high}$ are initialized with $T_{opt}$. In the second step, $T^{high}$ is successively incremented. After each increment edges are extracted using the hysteresis thresholding operation with the thresholds $T^{low}$ and $T^{high}$. The resulting edges are evaluated. $T^{high}$ is incremented until the result of the evaluation drops to a certain percentage (e.g., 95%) with respect to the best evaluation found so far. After this, the optimum upper threshold $T_{opt}^{high}$ is set to the threshold $T^{high}$ that corresponds to the best evaluation result. In the second step, $T^{low}$ is successively reduced. Again, the resulting edges are evaluated for each $T^{low}$ and $T_{opt}^{high}$. $T^{low}$ is reduced until the result of the evaluation drops to a certain percentage (e.g., 95%) with respect to the best evaluation found so far. After this, the optimum lower threshold $T_{opt}^{low}$ is set to the threshold $T^{low}$ that corresponds to the best evaluation result.

The Minimum Size of Object Parts

Figure 10:
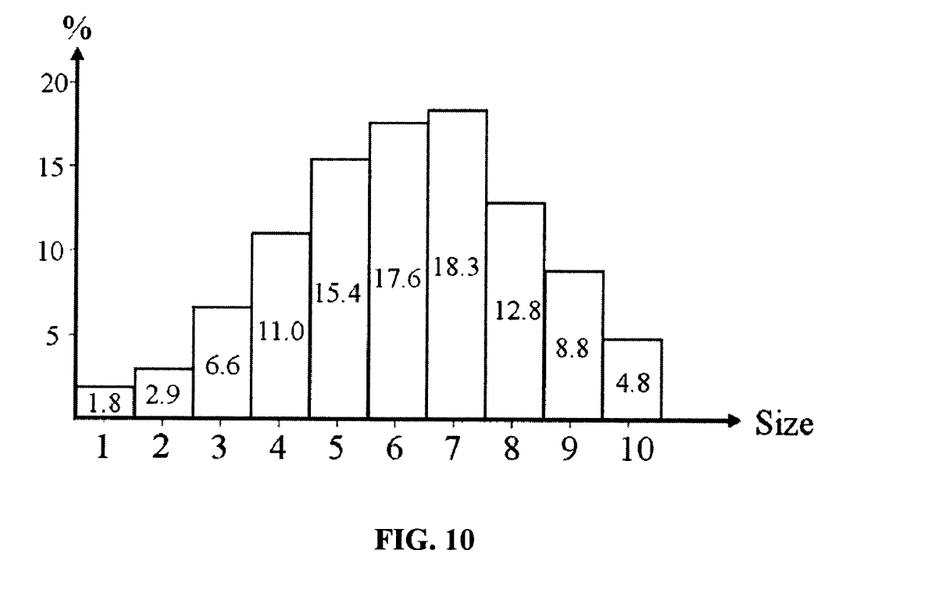
FIG. 10 shows the histogram of the component sizes, i.e., for each component size the fraction of components that have the respective size is visualized.
Figure 11:
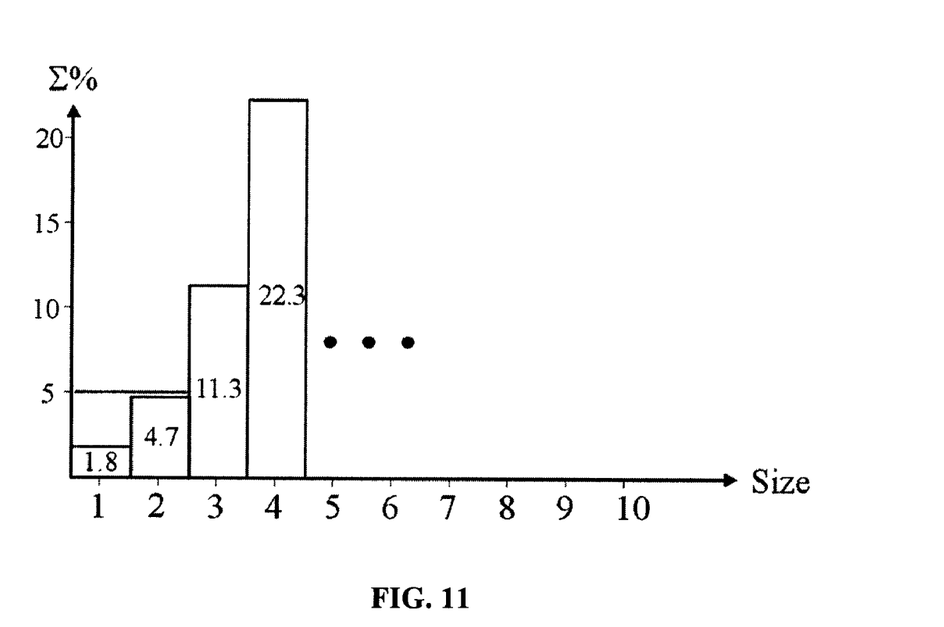
FIG. 11 shows the cumulative histogram of the component sizes, i.e., for each component size the fraction of components that have at most the respective size is visualized.

The minimum size of the object parts according to the second aspect of the present invention is computed such that at most a certain percentage (e.g., 5%) of the edge pixels is eliminated. For this, the edges are extracted using the thresholds that are either given by the user or automatically computed. Then, the connected components of the edges are extracted and their size, i.e., their length, is computed. In a preferred embodiment of the invention, the minimum size is determined using the histogram of the component sizes. In FIG. 10 an example histogram is shown. The histogram shows for each component size the fraction of components that have the respective size. For example, 11% of all components have a size of 4 pixels. Based on the histogram, the cumulative histogram can be computed by summing up the entries from left to right. The cumulative histogram of the histogram of FIG. 10 is shown in FIG. 11. The cumulative histogram shows for each component size the fraction of components that have at most the respective size. For example, 11.3% of all components have a size of at most 3 pixels. The minimum size corresponds to the first entry in the cumulative histogram (starting from the left) that exceeds the given percentage. In the preferred embodiment of the invention this percentage is set to 5%. Based on this percentage, the minimum size in the example shown in FIG. 11 would be 3. Thus, all connected components with a size below 3 are eliminated from the model. This leads to a reduced computation time and to a higher robustness of the object recognition.

The Model Point Reduction

The number of model points can be further reduced for large models, in accordance with the third aspect of the present invention. Often, the robustness and the accuracy of an object recognition approach increase with the number of model points. Unfortunately, also the computation time increases. However, in general, at a certain high number N of model points the accuracy and the robustness do not increase very much if the number of model points is further increased. This number N primarily depends on the used object recognition approach and secondarily depends on the object for which the model should be created. Consequently, there are two possible ways to determine the optimum number N, which are described in the following.

One embodiment of the invention takes both influences into account, i.e., the dependence on the object recognition approach as well as the dependence on the object itself is considered. For this, the user must provide some example images of the object in addition to the model image. Furthermore, the user must specify the number of object instances that should be found in each example image. Then, the automatic evaluation is started: First, the model is created based on the model image without reducing the number of model points. Second, the model is searched in each example image. If the user-specified number of instances has been found in each example image, the mean recognition time is stored as a function of the number of model points. After that, the number of model points is reduced by a certain factor, e.g., 20%. The (reduced) model is searched again in each example image. This process is repeated as long as the mean recognition time does not increase and as long as the user-specified number of instances is found in each example image. The optimum number N of model points corresponds to that number for which all user-specified instances are found and the mean recognition time is minimal. This approach is applicable for recognition approaches for which the computation time depends on the number of model points (e.g., EP-A-1

193 642, Ulrich et al. (2003)). Other approaches might need other optimization criteria but can be optimized in an analogous way.

The drawback of the described approach is that the user must provide some example images. Unfortunately, in many cases such example images are not available or at least difficult to obtain. Therefore, in a preferred embodiment of the invention, only one of the two influences is taken into account, i.e., the dependence on the object recognition approach but not the dependence on the object itself is considered. The disadvantage is that the resulting optimum number is not the real optimum but only an approximation. However, for most objects the approximation is sufficiently accurate. Thus, the objective is to empirically find an optimum number that is well-suited for most objects. This can be done by performing an empirical test using a sufficient number of example images of many different objects, which are stored in a large database, for example. For each object the optimization process that has been described is executed. Finally, the mean optimum number of model points is calculated over all tested objects. The mean optimum value is used as the optimum number N of model points for this recognition approach. This empirical determination needs to be performed only once for a certain recognition approach, and hence can be done by the system developer after the implementation. Consequently, the user does not need to provide any example images.

Finally, after N is known, large object models with more than N points can be thinned out by eliminating a sufficient number of model points. This can be done in such a way that only N model points are left, e.g., by only accepting every second, third, forth, etc. point. In doing so, it is advisable to select the points in a way that they are uniformly distributed over the complete model. Otherwise the robustness of the object recognition against occlusions, which typically affects the object in a non-uniform way, might decrease.

The Minimum Contrast of Image Structures

The minimum contrast separates the model from the noise in the image. Therefore, a good choice is the range of gray value changes caused by the noise in the image. If, for example, the gray values fluctuate within a range of 10 gray levels, the minimum contrast should be set to 10.

The present invention provides a method for automatically deriving the minimum contrast based on the noise in the model image. In order to estimate the image noise one of several well-known approaches can be applied (e.g., W. Förstner, Image Preprocessing for Feature Extraction in Digital Intensity, Color and Range Images, *Springer Lecture Notes on Earth Sciences*, Summer School on Data Analysis and the Statistical Foundations of Geomatics, 1999, J. Immerkaer, Fast Noise Variance Estimation, *Computer Vision and Image Understanding*, 64(2), 300-302, 1996). These methods return a value for the standard gray value deviation a of the image noise independently of the image content. Thus, there is no need to acquire several images or an image with a homogeneous gray value, but the noise can be estimated directly from the model image itself. The edge amplitude that can be caused by the noise depends on the standard deviation of the noise. In a preferred embodiment of the invention, the standard deviation is multiplied by a factor of 2.5, in order to ensure that most of the edges that are caused by the noise are taken into account. In general, the higher the factor is the lower is the possibility that edges that are caused by noise are falsely accepted. Finally, all edge pixels that have an edge amplitude below 2.5σ are eliminated from further processing.

In general, the minimum contrast can be used for excluding edges with an edge amplitude below the minimum contrast from further processing. Especially, it can be used to restrict the range of all possible thresholds that are computed during the automatic contrast determination to only those that exceed the minimum contrast.

The Discretization Step Length

In the following, the method of the fifth aspect of automatically computing the discretization step length is described for the model rotations only. However, the method can be easily applied to other transformations like scalings, for example, without leaving the scope of the present invention. The angle step length determines the step length within the user-specified range of angles, in which the object may appear in a run-time image. In general, the angle step should be chosen based on the size of the object. Smaller models do not have many different discrete rotations in the image, and hence the angle step length can be chosen larger for smaller models. The memory required to store the model is proportional to the number of angle steps. Hence, if the angle step is set too small, it may happen that the model no longer fits into the (virtual) memory. However, it is desirable that the model completely fits into the main memory, because this avoids paging by the operating system, and hence the time to find the object will be much smaller. Additionally, the computation time to recognize an object in the run-time image increases for smaller angles steps. On the other hand, if the angle step length is chosen too high, the robustness of the recognition decreases because certain orientations of the object in the run-time image are too far away from the closest model orientation, and hence, the object cannot be found.

The optimum step length strongly depends on the applied object recognition approach. Most recognition approaches compute a similarity measure between the model and the run-time image in order to decide whether the object is present at a given pose. Often, in addition to the pose of a found match, the result of the similarity measure is returned to the user in terms of a score value to describe the quality of the match (see EP-A-1 193 642, Ulrich et al. (2003), for example). Without loss of generality we can assume that a perfect match will return a score value of 1 while a score value below 1 indicates a lower similarity between the model and the run-time image. In the preferred embodiment of the invention the computation of the optimum discretization step length is based on the score value, which is returned by almost all recognition approaches.

Figure 12:
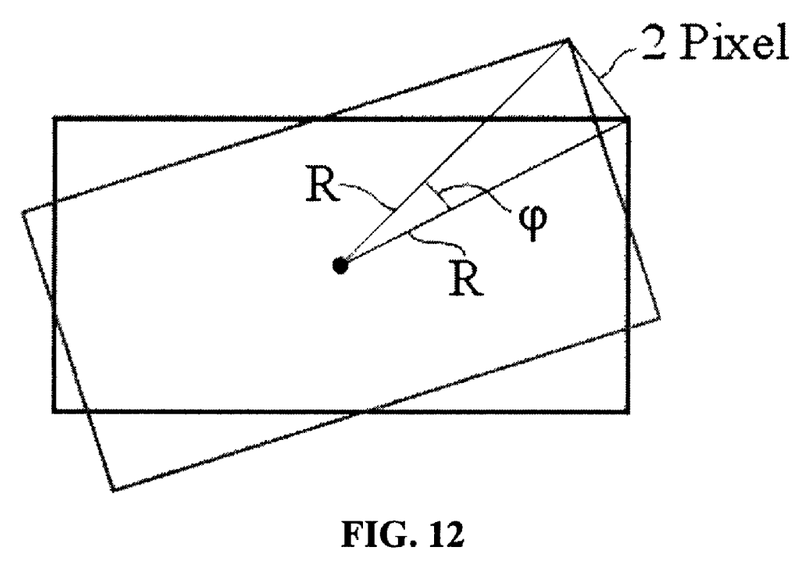
FIG. 12 illustrates the computation of the initial guess of the angle step length $\phi$ for the model rotations.

First, an initial guess for the step length is computed based on the model. One possible way is to compute the maximum distance of all model points from the center of rotation that is used to compute the single model orientations (see EP-A-1 193 642). FIG. 12 shows a simple rectangular object with the maximum distance of all model points from the center of rotation denoted by R. To compute the initial guess for the rotation step length φ it is assumed that the most distant model points is displaced by 2 pixels if the object is rotated by φ. Consequently, the initial guess can be computed as φ=2 arcsin (1/R). The chosen displacement depends on the recognition approach. For approaches that are less sensitive to small orientation changes the displacement can be enlarged and vice versa.

Figure 13A:
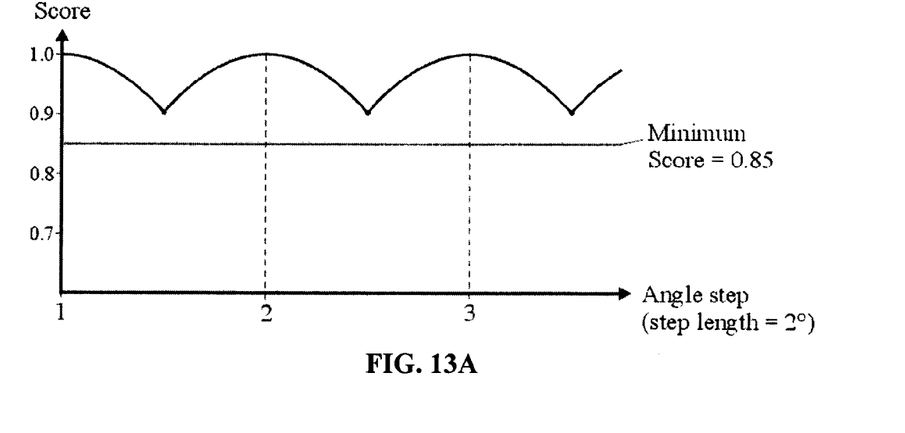
FIG. 13 shows the score with respect to the object orientation for one object (A) for which the initial guess can be accepted and for a second object (B) for which the initial guess must be halved (C).
Figure 13B:
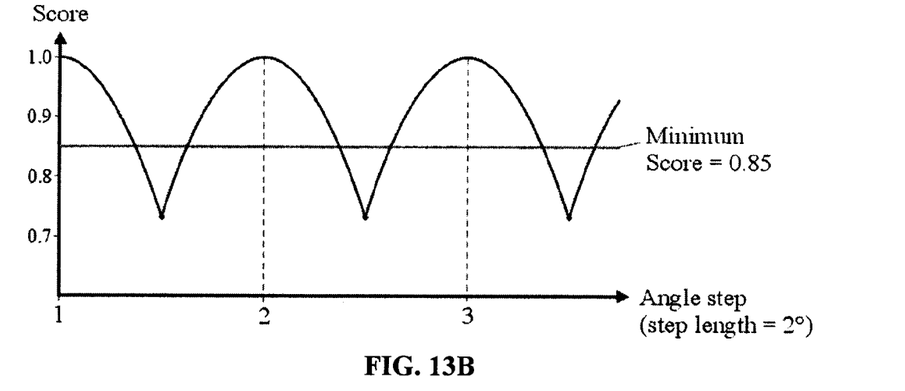
Figure 13C:
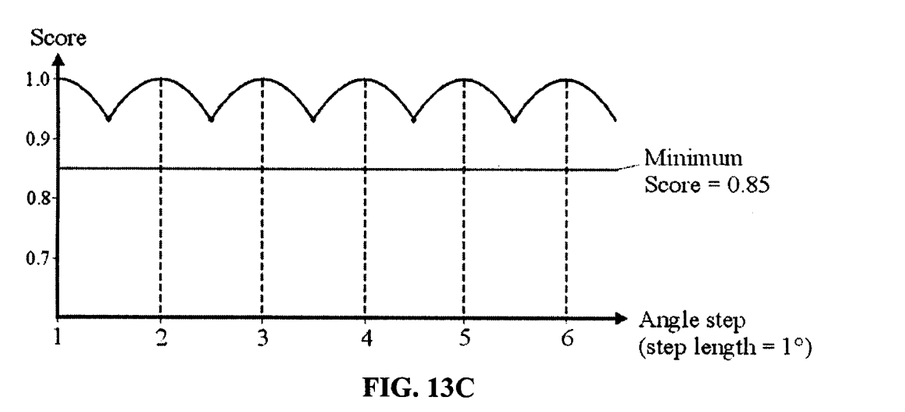

In the preferred embodiment of the invention the optimum angle step length is refined based on the initial guess. For this, it is assumed that the object model was created using the initial guess of the angle step length φ. Thus, the model is created at the sampled orientations of 0°, φ, 2φ, 3φ, etc. If the object appears in the run-time image at exactly one of these orientations a perfect match would be returned (discarding any image disturbances like noise or occlusions). An example is shown in FIG. 13A. Here, the initial guess of the angle step length was computed to be 2°. When plotting the score value with respect to the object orientation in the run-time image, one obtains a score value of 1 at the sampled orientations 0°, φ, 2φ, 3φ, etc., and a score value below 1 between two sampled orientations. The more the orientation of the object deviates from these sampled orientations, the more the score decreases. The lowest score value is obtained exactly in the center between two sampled orientations. In the example of FIG. 13A, the lowest obtained score value is approximately 0.9. Dependent on the applied recognition approach, a minimum score value that can be accepted, e.g., 0.85, must be defined. If the lowest obtained score still exceeds the minimum score, like in the example of FIG. 13A, the initial guess for the angle step is accepted. FIG. 13B shows the example of another object. Here, the lowest obtained score value is approximately 0.73, which is below the minimum score of 0.85. In the preferred embodiment of the invention the step length is halved in such cases. The result is shown in FIG. 13C. Now, the lowest obtained score value is approximately 0.93 which exceeds the minimum score. The process of halving the angle step length is repeated until the lowest obtained score exceeds the minimum score. In a preferred embodiment of the invention the score is not computed for all object orientations between 0° and φ but only at the orientation of φ/2, since the lowest score is expected to lie in the center between two sampled orientations. For this the model image is rotated by φ/2 and the similarity measure between the rotated model image and the non-rotated model and is computed.

In an alternative embodiment of the invention, no initial guess for the step length is computed. Instead, the similarity measure is computed between the non-rotated model and a model image that is increasingly rotated. The optimum step length is found if the score that is obtained for the current model image rotation is equivalent to the minimum score. Finally, the value of the optimum step length is twice the current rotation angle.

While several particular aspects and embodiments of the invention have been described in detail, various modifications of the preferred embodiments can be made without departing from the spirit and scope of the invention. Accordingly, the above description is not intended to limit the invention except as indicated in the following claims.

The invention claimed is:

1. A method performed by a computer for automatically determining a reduction factor for a number of model points comprising the steps of:
   (a) providing a digital image of the object to the computer with a camera;
   (b) identifying an edge amplitude of the image;
   (c) identifying an edge region of the object by applying a threshold value to the edge amplitude;
   (d) identifying an optimum number of model points that are at least necessary to achieve a predetermined robustness and accuracy; and
   (e) eliminating a respective fraction of model points such that the optimum number of model points determined in step (d) remain.

2. The method of claim 1, wherein in step (c) the threshold value is automatically obtained using a method comprising:
   (c1) providing a digital image of the object with a camera;
   (c2) identifying an edge amplitude of the object;
   (c3) identifying an edge region of the object for a range of thresholds applied to the edge amplitude;
   (c4) evaluating the edge region that is obtained for the range of thresholds, wherein a higher evaluation result indicates a better evaluation;
   (c5) generating an optimum threshold that corresponds to a maximum edge region value; and
   (c6) providing the optimum threshold that corresponds to the maximum edge region value, representing the contrast of the object.

3. The method of claim 1, wherein the optimum number of model points determined in step (d) is based on the current object and comprises the steps of:
   (d1) providing at least one electronic test image of the object;
   (d2) for each test image providing the number of object instances that should be recognized;
   (d3) providing a model representation of the object using the desired recognition approach;
   (d4) recognizing the object in each test image using the model representation and the desired recognition approach and determining a mean recognition time over all test images;
   (d5) reducing the number of model points by a predetermined factor;
   (d6) repeating steps (d4) to (d5) as long as the mean recognition time does not increase and as long as the number of object instances provided in step (d2) is found in each test image; and
   (d7) using an optimum number of model points for which the number of object instances provided in step (d2) is found and the mean recognition time is minimal.

4. The method of claim 3, wherein the optimum number of edge points determined in steps (d1)-(d7) is independent of the current object by repeating the steps (d1)-(d7) for a large number of objects and providing the mean value of an optimum number of model points.

5. A computer and data processing system for automatically determining a reduction factor for the number of model points, wherein the system is configured for:
   (a) providing a digital image of the object to the computer with a camera;
   (b) identifying an edge amplitude of the image;
   (c) identifying an edge region of the object by applying an automatically obtained threshold value;
   (d) identifying an optimum number of model points that are at least necessary to achieve a predetermined robustness and accuracy; and
   (e) eliminating a respective fraction of model points such that the optimum number of model points determined in step (d) remain.

6. A computer-readable medium including program instructions for automatically determining a reduction factor for the number of model points, wherein the program steps comprise:
   (a) providing a digital image of the object with a camera;
   (b) identifying an edge amplitude of the image;
   (c) identifying an edge region of the object by applying an automatically obtained threshold value;
   (d) identifying an optimum number of model points that are at least necessary to achieve a predetermined robustness and accuracy; and
   (e) eliminating a respective fraction of model points such that the optimum number of model points determined in step (d) remain.

* * * * *